United States Patent
Jolly et al.

(10) Patent No.: US 9,976,674 B2
(45) Date of Patent: May 22, 2018

(54) CONCRETE INSERT CHANNEL ASSEMBLY

(71) Applicant: Thomas & Betts International LLC, Wilmington, DE (US)

(72) Inventors: Robert Kevin Jolly, Cordova, TN (US); Mathew Thomas, Memphis, TN (US); Daniel P. Edwards, Cordova, TN (US); Charles Anthony Stout, Collierville, TX (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days. days.

(21) Appl. No.: 15/591,164

(22) Filed: May 10, 2017

(65) Prior Publication Data
US 2017/0328496 A1   Nov. 16, 2017

Related U.S. Application Data

(60) Provisional application No. 62/335,753, filed on May 13, 2016.

(51) Int. Cl.
*F16L 3/00* (2006.01)
*F16L 3/26* (2006.01)
*F16L 3/08* (2006.01)

(52) U.S. Cl.
CPC .. *F16L 3/26* (2013.01); *F16L 3/08* (2013.01)

(58) Field of Classification Search
CPC .......... E04G 15/06; H02G 3/26; H02G 3/383; H02G 3/22; E04B 1/40; E04B 1/41; E04B 1/4107; E04B 1/4142; F16L 3/08; F16L 3/26

USPC ...... 52/220.3, 710, 704, 707, 698, 689, 687, 52/378
See application file for complete search history.

(56) References Cited

U.S. PATENT DOCUMENTS

| | | | | |
|---|---|---|---|---|
| 1,021,867 A | * | 4/1912 | Goss | E04B 1/4107 52/710 |
| 1,581,262 A | * | 4/1926 | Zabriskie | E04B 1/4107 52/707 |
| 2,108,107 A | * | 2/1938 | De Wees | E04B 1/4107 52/701 |
| 2,345,650 A | | 4/1944 | Attwood | |

(Continued)

FOREIGN PATENT DOCUMENTS

| | | |
|---|---|---|
| DE | 19801650 A1 | 7/1999 |
| GB | 2134582 A | 8/1984 |
| WO | 2007/143784 A1 | 12/2007 |

*Primary Examiner* — Christopher Garft
(74) *Attorney, Agent, or Firm* — Hoffmann & Baron, LLP

(57) ABSTRACT

The present invention relates to a concrete channel assembly configured to prevent ingress of concrete into the concrete insert channel during construction. The concrete insert channel assembly includes a concrete insert channel having a plurality of anchor hooks, a plurality of base openings, first and second open ends, and a bottom opening, a plurality of sealing caps having a sealing cap body and a sealing support rib with the sealing support rib integrally connected to the sealing cap body, first and second end caps configured to removably mount and seal the first and second open ends, respectively, and a closure strip configured to slidably mount and seal the bottom opening. Each of the plurality of seal caps is configured to removably mount and seal each of the plurality of base openings of the concrete insert channel.

20 Claims, 6 Drawing Sheets

(56) References Cited

U.S. PATENT DOCUMENTS

| | | | | |
|---|---|---|---|---|
| 2,780,936 | A | * | 2/1957 | Hillberg ............... E04B 1/4107 52/379 |
| 3,319,384 | A | * | 5/1967 | Berg .................... E04B 1/4107 52/100 |
| 3,667,174 | A | * | 6/1972 | Arnett .................. E04B 1/6807 52/100 |
| 3,871,787 | A | | 3/1975 | Stegmeier |
| 4,059,933 | A | | 11/1977 | Funk et al. |
| 4,067,155 | A | | 1/1978 | Ruff et al. |
| 4,073,114 | A | * | 2/1978 | Irish ..................... E04B 1/4107 52/223.13 |
| 4,130,977 | A | * | 12/1978 | Taylor, Jr. ............ E04B 1/4107 52/710 |
| 4,532,740 | A | | 8/1985 | Fricker |
| 4,718,212 | A | * | 1/1988 | Illich ................... E04B 1/4107 52/699 |
| 5,623,804 | A | * | 4/1997 | Kelly ................... E04B 1/4107 52/704 |
| 5,625,993 | A | * | 5/1997 | Kelly ................... E04B 1/4107 52/506.05 |
| 5,636,759 | A | * | 6/1997 | Brummer ............... B29C 70/26 123/195 C |
| 6,021,619 | A | | 2/2000 | Mansson |
| 6,817,156 | B2 | | 11/2004 | Mok |
| 7,654,057 | B2 | | 2/2010 | Zambelli et al. |
| 2012/0060435 | A1 | | 3/2012 | Heudorfer et al. |

* cited by examiner

CONCRETE INSERT CHANNEL ASSEMBLY

CROSS REFERENCE TO RELATED APPLICATIONS

This application claims priority to U.S. Provisional Patent Application No. 62/335,753, filed on May 13, 2016, the contents of which are incorporated herein by reference in its entirety.

FIELD OF THE INVENTION

The present invention relates to channel assemblies, and more particularly, to concrete insert channel assemblies configured to prevent ingress of concrete into the concrete insert channel during construction.

BACKGROUND OF THE INVENTION

Various support structures, such as framing channels and concrete insert channels, are generally used for framing and mounting and for structural supports during construction of various facilities or buildings. In the beginning phase of the construction, the concrete insert channels are often imbedded into poured concrete of floor, ceiling, or wall. Once the concrete dries up and hardens, the concrete insert channels are used to support other structures such as pipes, wires, etc.

Generally, the concrete insert channels have various openings which must be sealed to prevent concrete from flowing into the concrete insert channel during the concrete pouring. In order to prevent the ingress of the concrete, currently, a foam insert is used to fit tightly inside the concrete insert channel across the entire length of the channel and thereafter, plugs are applied to each end of the channel to seal all the openings. Alternately, a metal sheet plate may be crimped inside the concrete insert channel to prevent the ingress of concrete. However, the current methods are difficult to operate due to the tight and limited space available inside the concrete insert channel.

Accordingly, although various concrete insert channel assemblies for preventing ingress of concrete are available currently in the marketplace, further improvements are possible.

SUMMARY OF THE INVENTION

According to an embodiment of the present invention, a concrete insert channel assembly includes a concrete insert channel having a plurality of anchor hooks, a plurality of base openings, first and second open ends, and a bottom opening, a plurality of sealing caps having a sealing cap body and a sealing support rib with the sealing support rib integrally connected to the sealing cap body, each of the plurality of seal caps configured to removably mount and seal each of the plurality of base openings, first and second end caps configured to removably mount and seal the first and second open ends, respectively, and a closure strip configured to slidably mount and seal the bottom opening.

These and other aspects of the present invention will be better understood in view of the drawings and following detailed description.

DETAILED DESCRIPTION OF PREFERRED EMBODIMENTS

Figure 1:
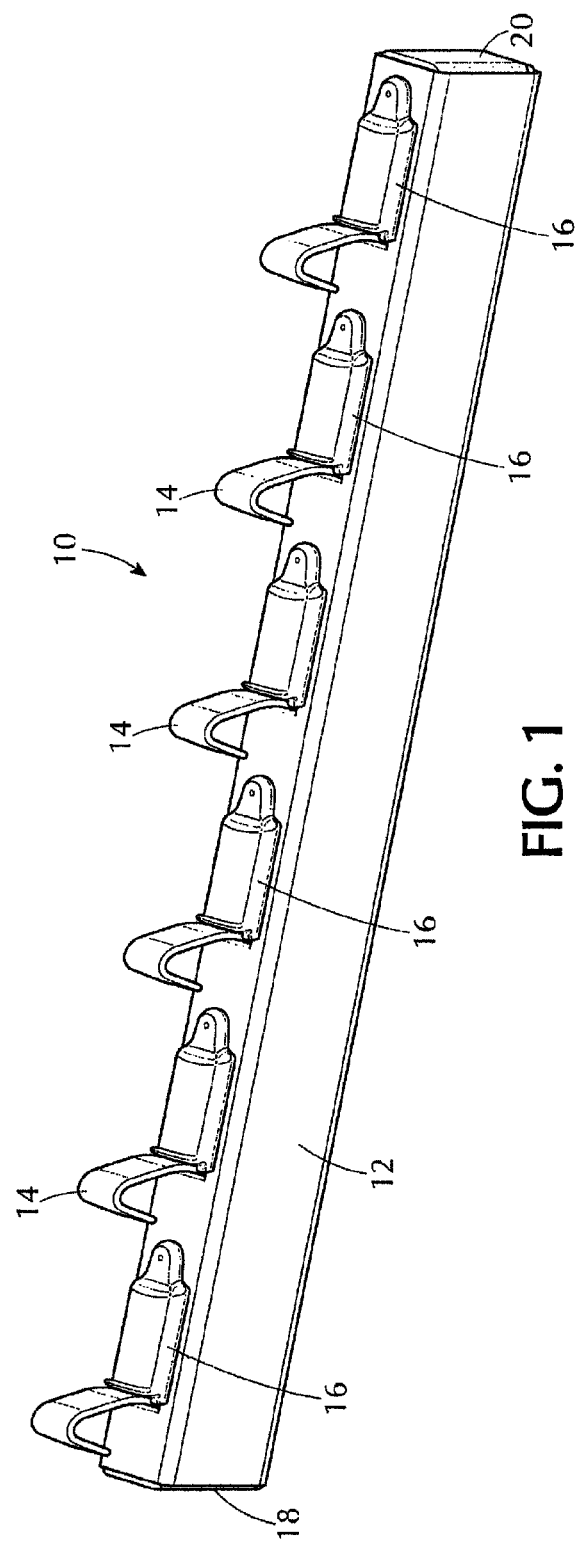
FIG. 1 is a perspective view of a concrete insert channel assembly, according to an embodiment of the present invention.
Figure 2:
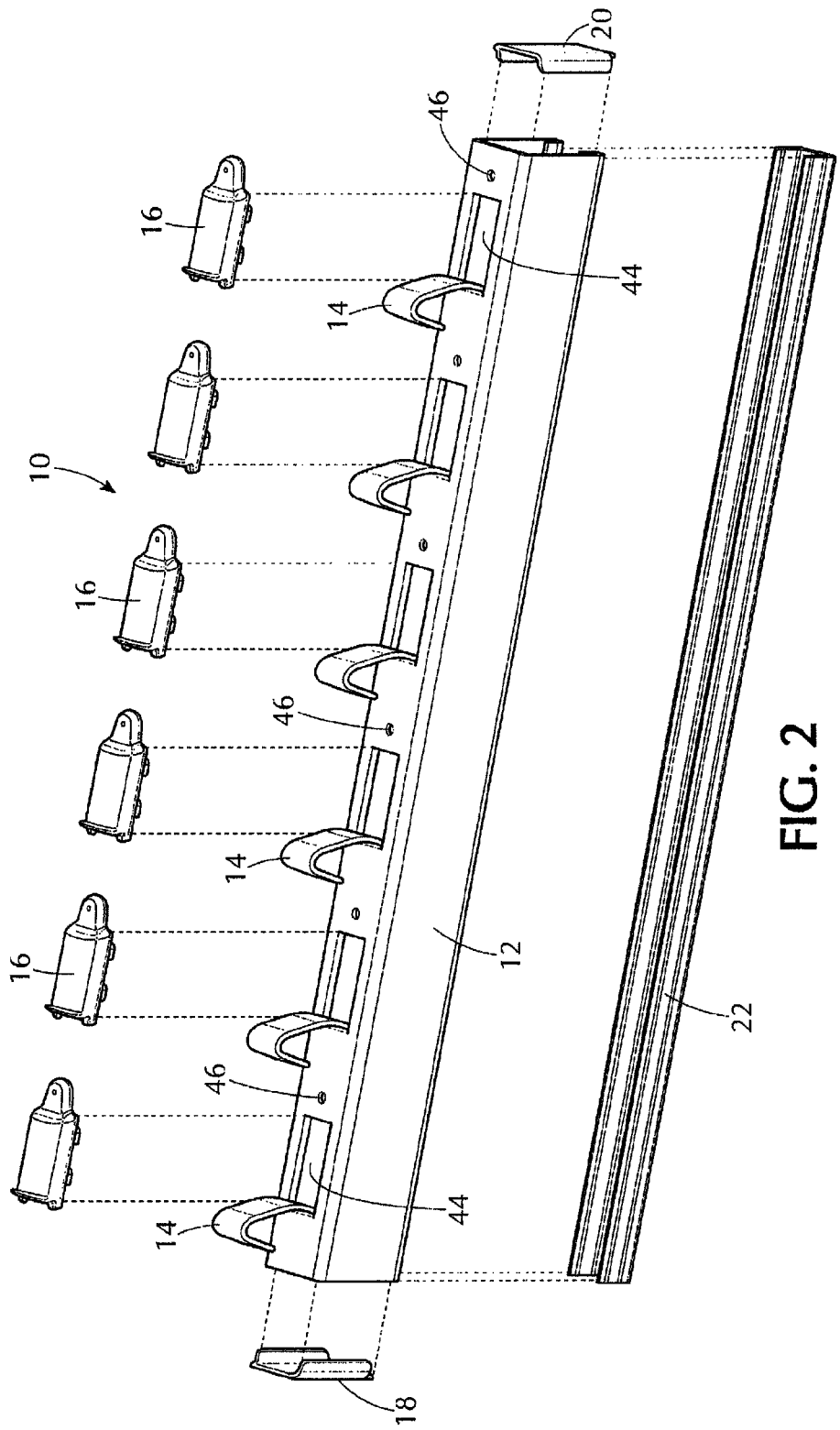
FIG. 2 a exploded perspective view of the concrete insert channel assembly in FIG. 1.

According to an embodiment of the present invention, referring to FIGS. 1 and 2, a concrete insert channel assembly 10 includes a concrete insert channel 12 having a plurality of anchor hooks 14, a plurality of sealing caps 16, first and second end caps 18, 20, and a closure strip 22. The plurality of sealing caps 16, first and second end caps 18, 20 and closure strip 22 are designed and configured to removably mount and seal a plurality of openings defined in the concrete insert channel 12 to prevent concrete from flowing into the concrete insert channel 12 during construction. In addition, the plurality of sealing caps 16 are constructed to sustain the heavy pressure from concrete pouring and to maintain a tight sealing over the plurality of openings, as will be described in greater detail below.

Directional terms, such as top, bottom, side, front and rear are referenced to an orientation in which the concrete insert channel 12 is placed on the ground with the plurality of anchor hooks 14 extending upwards. However, the present invention is not thereby limited to use in particular orientation.

Figure 3:
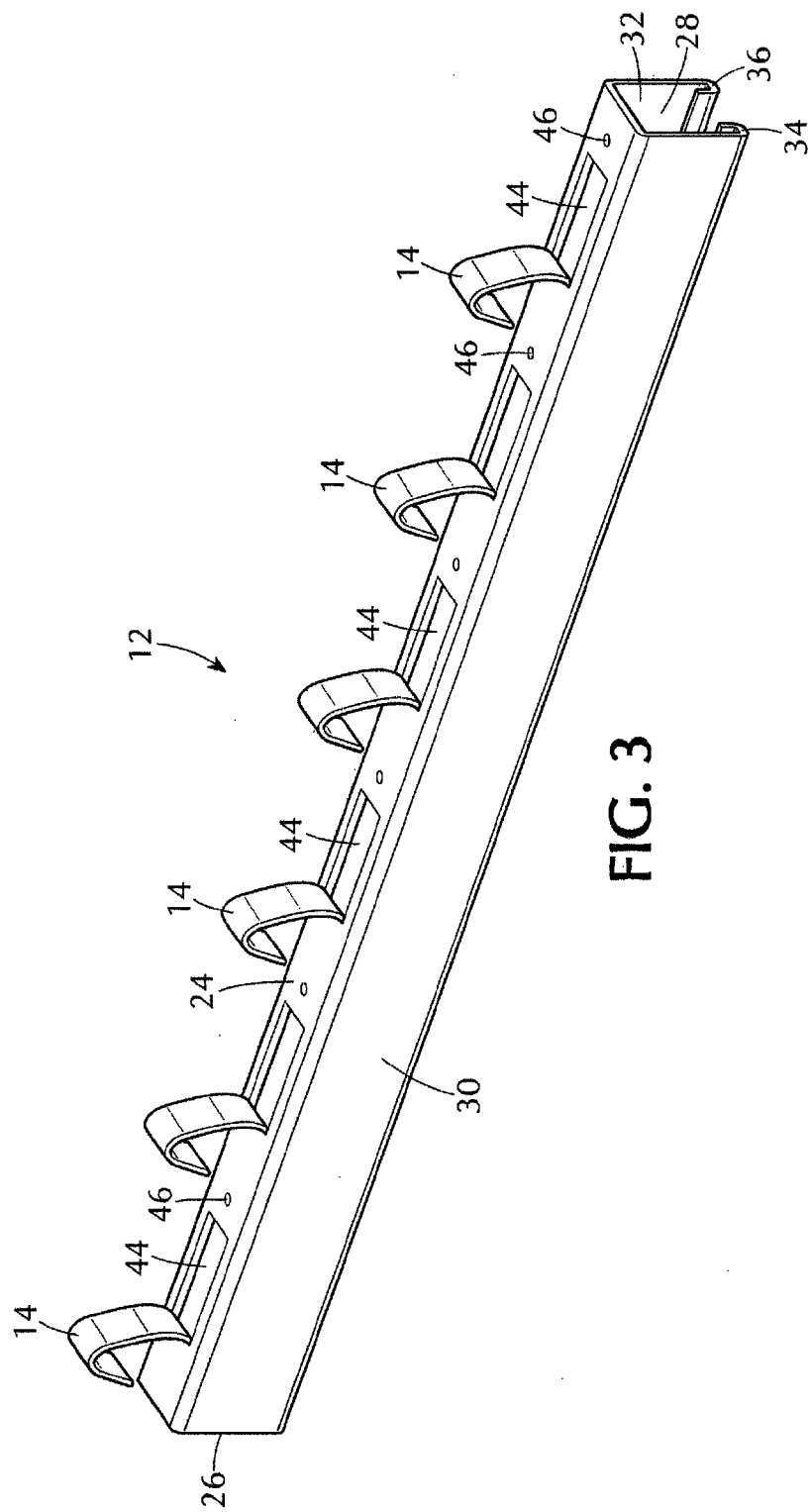
FIG. 3 is a perspective view of the concrete insert channel in FIG. 1.
Figure 4:
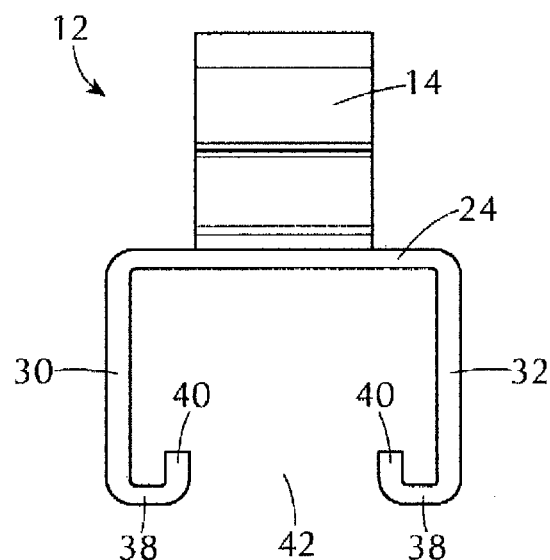
FIG. 4 is an end view of the concrete insert channel in FIG. 3.
Figure 5:
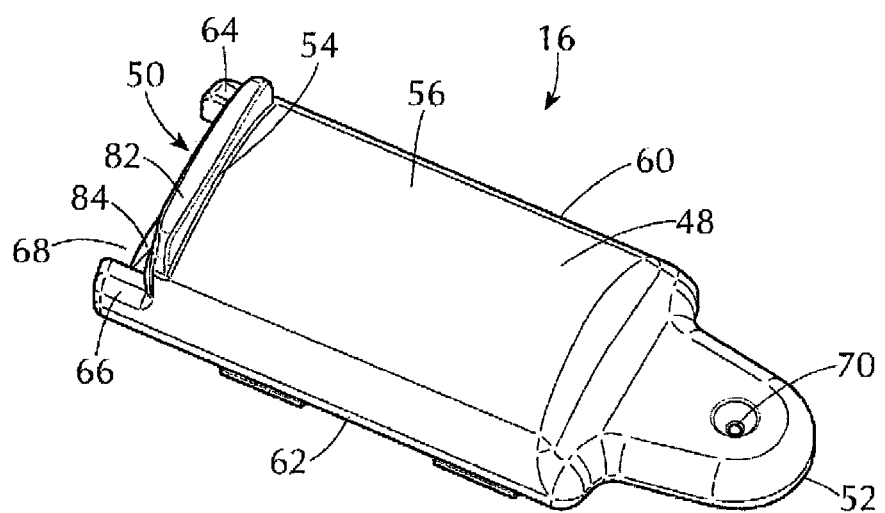
FIG. 5 is a perspective top view of the sealing cap in FIG. 1.

Referring to FIGS. 3 and 4, in the depicted embodiment, the concrete insert channel 12 is an elongated metal strut, which includes a base 24 extending between first and second open ends 26, 28, first and second opposed side walls 30, 32 connected and separated by the base 24, and first and second inturned members 34, 36 having a bottom portion 38 and an upturned portion 40. The first and second side walls 30, 32 are parallel and extend substantially perpendicular to the base 24. The first and second inturned members 34, 36 are disposed on the bottom of the concrete insert channel 12 and are connected to the first and second side walls 30, 32, respectively, thereby forming a bottom opening 42 therebetween.

The base 24 includes the plurality of anchor hooks 14 that are integrally formed with the base 24. Specifically, the plurality of anchor hooks 14 are formed by pressing out from the base 24 and extend outwardly therefrom such that a plurality of base openings 44 are defined immediately adjacent to each corresponding anchor hook 14 across the base 24. During the construction, the plurality of sealing caps 16, as will be described in greater detail below, are removably mounted on the plurality of base openings 44 to prevent concrete from flowing into the concrete insert channel 12.

Referring again to FIG. 3, the base 24 defines a plurality of nail holes 46 across the base 24, through which a nail could be applied to firmly affix the concrete insert channel 12 to the concrete side of a form before the concrete pouring.

The plurality of nail holes 46 are positioned closely adjacent to each corresponding base opening 44. The anchor hooks 14, base openings 44, and nail holes 46 are uniformly spaced apart at a predetermined interval across the entire length of the base 24.

Referring to FIGS. 5-8, in the depicted embodiment, each of the plurality of sealing caps 16 preferably has an "ironing board" shape and comprises a sealing cap body 48 and a sealing support rib 50. The sealing cap body 48 includes a first end 52, a second end 54, top and bottom surfaces 56, 58, and first and second edges 60, 62. The first end 52 of each of the plurality of sealing caps 16 is preferably arcuate; alternately, the first end 52 could be in any other shape such as rectangular, round, etc. The top surface 56 is designed and configured such that it provides adequate support and strength to sustain the heavy pressure from the concrete pouring. Preferably, the top surface 56 is convexly-curved.

Figure 7:
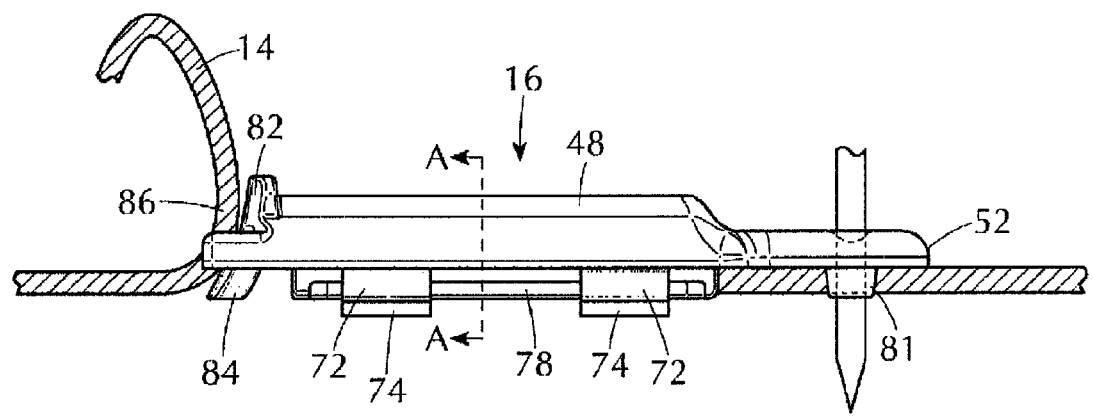
FIG. 7 is a side view of the sealing cap in FIG. 1, applied to the concrete insert channel.
Figure 8:
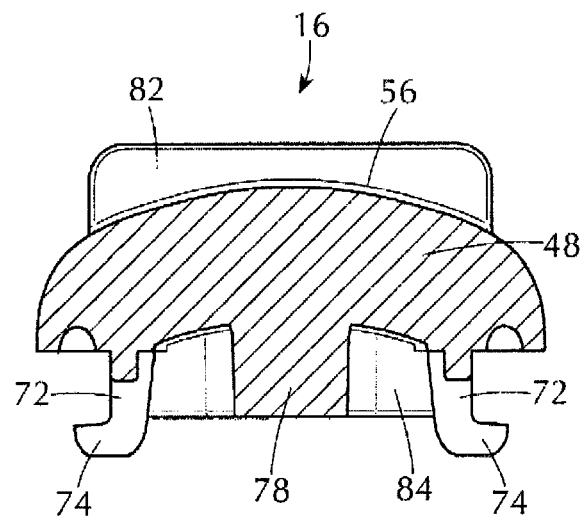
FIG. 8 is a sectional view taken along line A-A of FIG. 7.

The sealing cap body 48 further includes first and second tails 64, 66, which extend laterally from side portions of the second end 54 of the sealing cap body 48, defining a sealing support rib area 68 therebetween. A nail insert recess 70 is defined near the first end 52 of the sealing cap body 48 and extends approximately a half way through the sealing cap body 48 from the top surface 56, as shown in FIG. 7. Each of the plurality of sealing caps 16 is configured and dimensioned to provide a tight seal over each of the plurality of base openings 44. In addition, the sealing cap 16 is designed such that, once it is mounted on the base opening 44, the nail insert recess 70 aligns with the nail hole 46. Once the sealing cap 16 is mounted over the base opening 44, a nail can be used to pierce the nail insert recess 70 and extend through the nail hole 46 to firmly affix the concrete insert channel 12 to the concrete side of the form.

Figure 6:
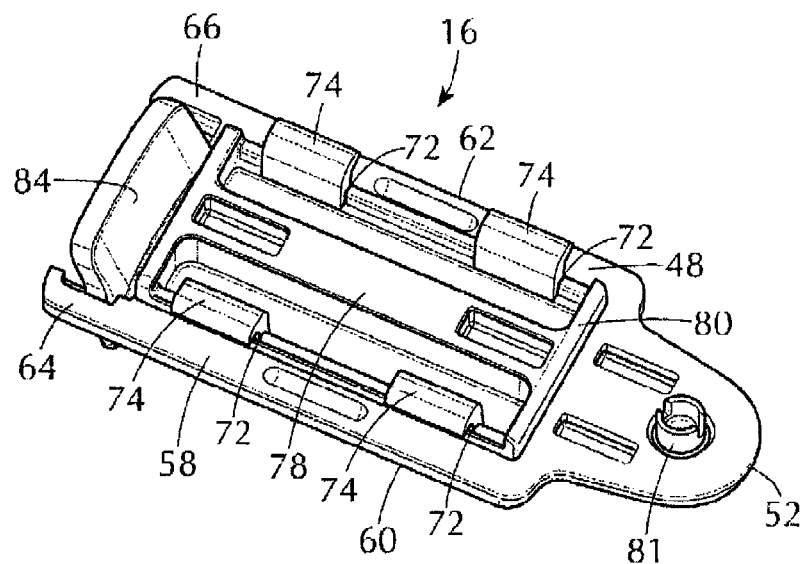
FIG. 6 is a perspective bottom view of the sealing cap in FIG. 1.
Figure 9:
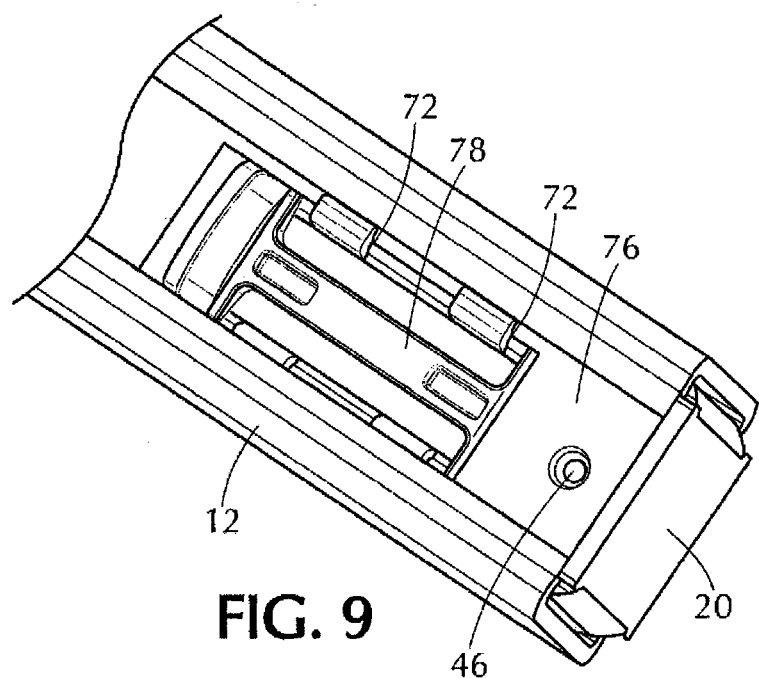
FIG. 9 is a bottom view of the concrete insert channel in FIG. 1, with the sealing cap applied thereon.

Referring more particularly to FIG. 6, the sealing cap body 48 further includes a plurality of flexible mounting clips 72, which extend downwardly from the bottom surface 58 of the sealing cap body 48 such that they are substantially perpendicular thereto. Each of the plurality of mounting clips 72 has a clipping member 74 at the bottom, which extends laterally. When the sealing cap 16 is mounted over the base opening 44, the plurality of mounting clips 72 smoothly snap into the base opening 44 and expand outwardly such that each clipping member 74 tightly engages with the bottom surface 76 of the base 24 to retain the sealing cap 16 firmly in place, as illustrated in FIG. 9.

Referring again to FIG. 6, first and second stiffening ribs 78, 80 are formed integrally from the bottom surface 58 of the sealing cap body 48 and protrude downwardly therefrom. The first stiffening rib 78 extends across the middle of the sealing cap body 48, and the second stiffening rib 80 is positioned near the first end portion of the sealing cap body 48. The first and second stiffening ribs 78, 80 provide additional support and strength for preventing the sealing cap 16 from collapsing due to the concrete pouring pressure. In addition, a nail hole plug 81 is defined near the first end 52 of the sealing cap body 48 and extends downwardly from the bottom surface 58 of the sealing cap body 48. The nail hole plug 81 is configured and dimensioned to provide a tight seal over the nail hole 46. The nail hole plug 81 is concentric with the nail insert recess 70 such that a nail can extend through the nail insert recess 70, nail hole 46, and nail hole plug 81, as shown in FIG. 7.

Referring again to FIGS. 5-8, the sealing support rib 50 comprises a top support rib member 82 and a bottom support rib member 84. The sealing support rib 50 is integrally connected to the second end 54 of the sealing cap body 48 such that it is positioned and disposed within the sealing support rib area 68. The top support rib member 82 extends vertically upward from the second end 54 of the sealing cap body 48. The bottom support rib member 84 extends downwardly with an approximately 30 degree angle relative to the second end 54 of the sealing cap body 48. The sealing support rib 50 is adapted to tightly engage with a bottom portion 86 of each of the plurality of anchor hooks 14 to prevent ingress of concrete into the concrete insert channel 12. Specifically, as shown in FIG. 7, contours of the bottom support rib member 84 provide a tight pressing against the bottom portion 86 of the anchor hook 14 to completely seal any opening, whereas the top support rib member 82 provides strength and stiffness against the bottom portion 86 of the anchor hook 14 to maintain the tight sealing during the concrete pouring.

Referring back to FIGS. 1 and 2, the first and second end caps 18, 20 are configured and dimensioned to removably mount and seal the first and second open ends 26, 28 of the concrete insert channel 12, respectively. The closure strip 22 is elongated and adapted to slidably fit and mount along the bottom of the concrete insert channel 12 to completely seal the bottom opening 42. After the concrete pouring, the closure strip 22 can be separated or removed from the concrete insert channel 12.

The plurality of sealing caps 16, first and second end caps 18, 20, and closure strip 22 are made of one or more materials having suitable properties for a desired application, including strength, weight, rigidity, etc. Flexible and resilient materials such as rubber, plastic and the like are generally preferred.

From the foregoing, it will be appreciated that a concrete insert channel assembly according to the present invention easily and conveniently prevents concrete from flowing into a concrete insert channel.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A concrete insert channel assembly comprising;
   a concrete insert channel having a plurality of anchor hooks, a plurality of base openings, first and second open ends, and a bottom opening;
   a plurality of sealing caps having a sealing cap body and a sealing support rib with the sealing support rib integrally connected to the sealing cap body, each of the plurality of seal caps configured to removably mount and seal each of the plurality of base openings, wherein the sealing cap body includes a first end, a second end, top and bottom surfaces, and first and second edges, and wherein the sealing support rib includes a top support rib member extending vertically upward from the second end of the sealing cap body and a bottom support rib member extending downwardly with an angle relative to the second end of the sealing cap body;
   first and second end caps configured to removably mount and seal the first and second open ends, respectively; and
   a closure strip configured to slidably mount and seal the bottom opening.

2. The concrete insert channel assembly of claim 1, wherein each of the plurality of sealing caps further includes:

first and second tails, the first and second tails extending laterally from side portions of the second end of the sealing cap body and defining a sealing support rib area therebetween; and a plurality of flexible mounting clips, each of the plurality of flexible mounting clips extending downwardly from the bottom surface of the sealing cap body.

3. The concrete insert channel assembly of claim 1, wherein each of the plurality of sealing caps is designed and dimensioned to provide a tight seal over each of the plurality of base openings.

4. The concrete insert channel assembly of claim 1, wherein a nail insert recess is defined near the first end of the sealing cap body and extends approximately a half way through the sealing cap body from the top surface of the sealing cap body.

5. The concrete insert channel assembly of claim 1, wherein the top surface is designed and configured to provide support and strength to sustain the heavy pressure from concrete pouring.

6. The concrete insert channel assembly of claim 2, wherein each of the plurality of mounting clips has a clipping member at the bottom, which extends laterally.

7. The concrete insert channel assembly of claim 2, wherein each of the plurality of sealing caps further includes first and second stiffening ribs, each of which protrudes downwardly from the bottom surface of the sealing cap body.

8. The concrete insert channel assembly of claim 7, wherein the first stiffening rib extends across the middle of the sealing cap body, and the second stiffening rib is positioned near the first end portion of the sealing cap body such that the stiffening ribs provide additional support and strength for preventing the sealing cap from collapsing due to the concrete pouring pressure.

9. The concrete insert channel assembly of claim 2, wherein the sealing support rib is integrally connected to the second end of the sealing cap body such that it is positioned and disposed within the sealing support rib area.

10. The concrete insert channel assembly of claim 1, wherein contours of the bottom support rib member provide a tight pressing against a bottom portion of the anchor hook to completely seal any opening, whereas the top support rib member provides strength and stiffness against the anchor hook to maintain the tight sealing during concrete pouring.

11. The concrete insert channel assembly of claim 1, wherein the concrete insert channel further includes:
a base extending between the first and second open ends;
a first side wall and a second side wall, the first and second side walls connected and separated by the base; and
a first inturned member and a second inturned member, the first and second inturned members connected to the first and second side walls, respectively.

12. The concrete insert channel assembly of claim 11, wherein the plurality of anchor hooks are formed by pressing out from the base and extend outwardly therefrom such that the plurality of base openings are defined immediately adjacent to each corresponding anchor hook.

13. The concrete insert channel assembly of claim 12, wherein the base defines a plurality of nail holes through which a nail could be applied to firmly affix the concrete insert channel to the concrete side of a form before concrete pouring.

14. The concrete insert channel assembly of claim 13, wherein the plurality of anchor hooks, base openings, and nail holes are uniformly spaced apart at a predetermined interval across the entire length of the base.

15. The concrete insert channel assembly of claim 1, wherein the first and second end caps are configured and dimensioned to removably mount and seal the first and second open ends of the concrete insert channel, respectively.

16. The concrete insert channel assembly of claim 1, wherein the closure strip is elongated and adapted to slidably fit and mount to the bottom of the concrete insert channel to completely seal the bottom opening.

17. The concrete insert channel assembly of claim 1, wherein the plurality of sealing caps, first and second end caps, and closure strip are made out of flexible and resilient materials.

18. The concrete insert channel assembly of claim 1, wherein the first end of the sealing cap body is arcuate.

19. A concrete insert channel assembly comprising:
a concrete insert channel including:
a plurality of anchor hooks;
a plurality of base openings;
first and second open ends;
a bottom opening;
a base extending between the first and second open ends;
first and second side walls, the first and second side walls connected and separated by the base; and
first and second inturned members, the first and second inturned members connected to the first and second side walls, respectively;
a plurality of sealing caps having a sealing cap body and a sealing support rib with the sealing support rib integrally connected to the sealing cap body, each of the plurality of seal caps configured to removably mount and seal each of the plurality of base openings, wherein the sealing cap body includes a first end, a second end, top and bottom surfaces, and first and second edges;
first and second end caps configured to removably mount and seal the first and second open ends, respectively; and
a closure strip configured to slidably mount and seal the bottom opening,
wherein the plurality of anchor hooks are formed by pressing out from the base and extend outwardly therefrom such that the plurality of base openings are defined immediately adjacent to each corresponding anchor hook,
wherein the base defines a plurality of nail holes through which a nail could be applied to firmly affix the concrete insert channel to the concrete side of a form before concrete pouring, and
wherein a nail hole plug is defined near the first end of the sealing cap body and extends downwardly from the bottom surface of the sealing cap body to provide a tight seal over the nail hole of the concrete insert channel.

20. The concrete insert channel assembly of claim 1, wherein the angle is a 30 degree angle.

* * * * *